(12) United States Patent
Thompson et al.

(10) Patent No.: US 8,035,573 B2
(45) Date of Patent: Oct. 11, 2011

(54) DEPLOYABLE PANEL STRUCTURE FOR AN ARRAY ANTENNA

(75) Inventors: Alan Thompson, Isle of Wight (GB); Martin Simon Thompson, Isle of Wight (GB)

(73) Assignee: Agence Spatiale Europeenne, Paris Cedex (FR)

( * ) Notice: Subject to any disclaimer, the term of this patent is extended or adjusted under 35 U.S.C. 154(b) by 364 days.

(21) Appl. No.: 12/314,031

(22) Filed: Dec. 3, 2008

(65) Prior Publication Data

US 2010/0045563 A1 Feb. 25, 2010

(30) Foreign Application Priority Data

Dec. 4, 2007 (GB) .................................. 0723702.7

(51) Int. Cl.
*H01Q 1/08* (2006.01)
(52) U.S. Cl. ....................................... 343/881; 343/757
(58) Field of Classification Search .................. 343/757, 343/878, 881, 882, DIG. 2
See application file for complete search history.

(56) References Cited

U.S. PATENT DOCUMENTS

| 5,785,280 | A | * | 7/1998 | Baghdasarian | 244/172.6 |
| 5,927,654 | A | * | 7/1999 | Foley et al. | 244/172.6 |
| 6,010,096 | A | * | 1/2000 | Baghdasarian | 244/172.6 |
| 6,366,255 | B1 | * | 4/2002 | Chiang | 343/781 P |
| 7,211,722 | B1 | * | 5/2007 | Murphy | 136/245 |

FOREIGN PATENT DOCUMENTS

EP 0 888 967 1/1999

* cited by examiner

*Primary Examiner* — Hoanganh Le
(74) *Attorney, Agent, or Firm* — Clark & Brody

(57) ABSTRACT

A deployable panel structure for an array antenna comprising a first and a second set of panels hinged together for deployment between a folded configuration for stowage and an elongate unfolded configuration; wherein the panels of said first set are hinged together about a plurality of spaced-apart axes which are transverse to an elongate axis of the unfolded structure and the panels of said second set are hinged to panels of the first set about lengthwise axes parallel to said elongate axis of the unfolded structure; and wherein the number and arrangement of the panels is such that a width of the unfolded structure, measured transversely of its elongate extent, is less at one or both of its ends than the width of its middle portion.

13 Claims, 20 Drawing Sheets

DEPLOYABLE PANEL STRUCTURE FOR AN ARRAY ANTENNA

This invention relates to a foldable and deployable panel structure for a radar or communication array antenna. The panel structure of the invention is particularly well-suited for deployment at altitude, e.g. in space, from an airship or from a lighter-than-air vehicle (balloon).

Panel structures for array antennas are relatively large when deployed, but need to be as small as conveniently possible for stowage in or on the vehicle which is to transport them to altitude.

In order to solve this problem, European Patent 0 888 967 discloses a spacecraft platform comprising at least two deployable panels, hinged together and arranged to move between a folded position, for stowage, and a deployed position, for operation. Respective faces of said deployable panels can form, in their deployed position, a supporting structure for a SAR (synthetic aperture radar) antenna.

The present invention is directed, in one aspect, to providing an improved solution to this problem, increasing the surface of the antenna in its deployed state, while keeping the volume of the folded structure to a minimum.

A particular application of the invention is in a synthetic aperture radar for use in terrestrial mapping, for example in the European Space Agency Earth Explorer Core Mission BIOMASS. The radar used for this purpose will be P-band operating at 435 MHz. As such this radar could interfere with the use of this frequency by others to whom it has been assigned under the International Telecommunications Union. It may also interfere with some defence use on adjacent frequencies. Consequently it is necessary that the transmissions from the antenna are accurately directed, and in particular that unwanted side lobes are minimised. The use of an elongate rectangular SAR antenna array is known for spaceborne terrestrial radar mapping and the radiation pattern of such an antenna would produce unwanted side lobes, which would result in an excessively high power flux density at the surface of the Earth. The unwanted sidelobes can be reduced to an acceptable level by differentially-powering the individual elements of the array, but this requires a complex and costly beam-forming network. A similar problem arises in array antennas for communication applications.

The present invention in a further aspect provides an alternative solution to this problem, which either eliminates completely the complication of differential powering (or receive gain, in the case of a receiving antenna) of the individual elements of the array, or reduces the degree of differential powering (differential gain, respectively) that might otherwise be required. The present invention can thus simplify the architecture of such radio frequency systems.

Another important issue for space- or air-borne panel structures is stiffness. Indeed, such structures are characterized by a large surface and a reduced thickness, and therefore they are subject to oscillate. Oscillation or vibration of an antenna structure introduces an unwanted time-dependent change of the radiation pattern, which interfere with the operation of the radar or communication apparatus. Low-frequency modes are particularly detrimental because they can be easily excited, e.g. during attitude and orbit control manoeuvres.

The present invention is directed, in one further aspect, to increase the stiffness of a panel structure for an antenna in order to push its oscillation eigenmodes towards higher frequencies.

In one aspect the invention provides a deployable panel structure for an array antenna comprising a first and a second set of panels hinged together for deployment between a folded configuration for stowage and an elongate unfolded configuration; wherein the panels of said first set are hinged together about a plurality of spaced-apart axes which are transverse to an elongate axis of the unfolded structure and the panels of said second set are hinged to panels of the first set about lengthwise axes parallel to said elongate axis of the unfolded structure; and wherein the number and arrangement of the panels is such that a width of the unfolded structure, measured transversely of its elongate extent, is less at one or both of its ends than the width of its middle portion As it will be discussed in detail below, side lobes in the principal planes of the radiation pattern of the antenna are reduced compared to those of a rectangular antenna having the same length as the unfolded structure and a width equal to the width of the middle portion of the unfolded structure; the increased width of the structure also allows for some steerability of the radiation lobe in a direction perpendicular to the elongated axis of the antenna. Moreover, the antenna structure is stiffer and shows a more convenient surface-to-volume ratio than a conventional foldable rectangular antenna. These features are very important, in particular for space applications.

In short, there is a valuable synergy between mechanical and electromagnetic properties of the claimed structure.

The antenna structure of the invention can be used in the radio-waves and microwaves regions of the spectrum, but is particularly well-suited for "low" frequencies—i.e. frequencies comprised between a few tens MHz to a few GHz, i.e. between 100 MHz and about 5 GHz. This is because electromagnetic waves at such "low" frequencies have a comparatively long wavelength and therefore large antennas are required in order to achieve satisfactory directivity.

According to particular embodiments of the invention:
The width of said structure in its deployed state can decrease stepwise from said central portion towards its ends in said longitudinal direction, resulting in a "stepped aperture".
A first panel of the first set can be hinged along opposite edges thereof to at least two second said panels of the first set such that upon deployment there is relative rotation between the first panel and each second panel in the same sense.
A principal said transverse axis can be approximately at a mid-point of the longitudinal extent of the unfolded structure.
In its folded configuration, the structure can be folded such that it is wider—measured transversely of its longitudinal extent—at one end than at the other.
A principal said transverse axis can be approximately at a mid-point of the longitudinal extent of the unfolded structure; wherein the structure is folded such that it is wider—measured transversely of its longitudinal extent—at one end than at the other; and wherein said one end becomes the mid-point of the structure when unfolded.
In the folded configuration of the structure, a plurality of panels can define a stowage space in which further panels are disposed.
The reduced width on the unfolded structure toward its ends can be provided by a change in the number of panels of said second set along the length of the array.
The reduced width on the unfolded structure toward its ends can be provided by a change in the width of panels along the length of the array.
At least one panel of said second set can be disposed so that upon deployment of the structure, it is unfolded about a lengthwise axis before the structure is unfolded about the principal transverse axis.

The structure can be adapted to deploy from its folded to its unfolded configuration in the following sequence:
the structure is unfolded about the principal transverse axis
at least one panel of said first set is unfolded about another said transverse axis or axes
at least one panel of said second set is unfolded about a said lengthwise axis or axes.

The structure can be adapted to deploy from its folded to its unfolded configuration in the following sequence:
at least one panel of said second set is unfolded about a said lengthwise axis
the structure is unfolded about the principal transverse axis
at least one panel of said first set is unfolded about another said transverse axis
at least one further panel of said second set is unfolded about a said lengthwise axis.

Said panels can carry a plurality of antenna elements which, when the structure is deployed, form an array antenna.

In a further aspect the invention provides a synthetic aperture radar comprising an array antenna constituted by such a structure.

In a further aspect the invention provides a communication payload comprising an array antenna constituted by such a structure.

In a further aspect the invention provides a spacecraft comprising an array antenna constituted by such a structure.

The invention now will be described merely by way of example with reference to the accompanying drawings, wherein.

Figure 20:
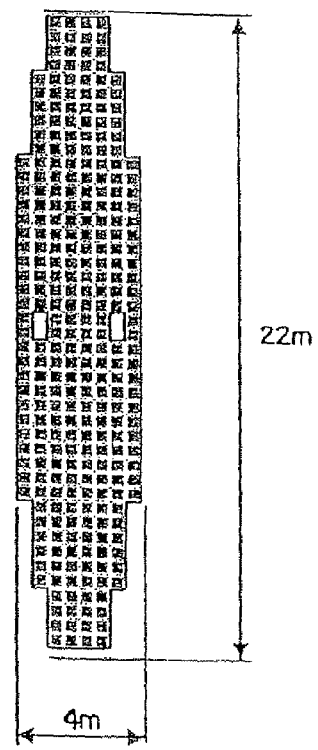
Figure 19A:
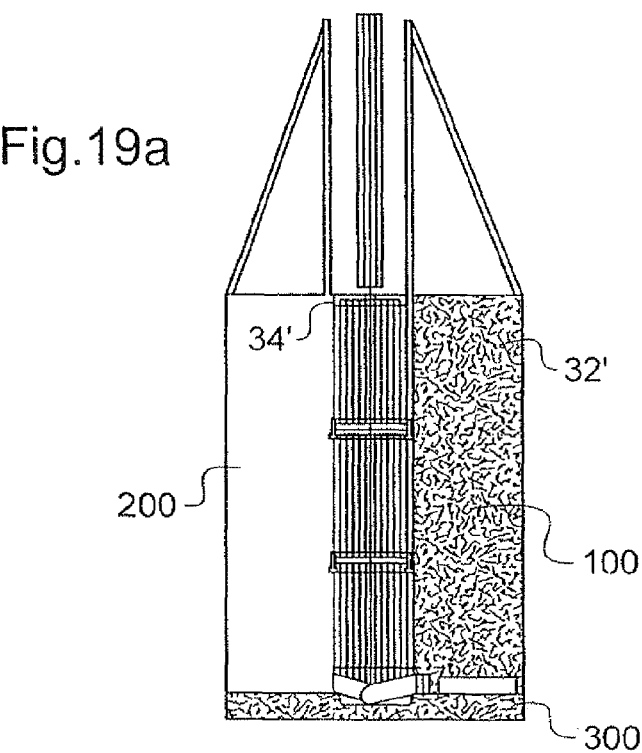
Figure 19B:
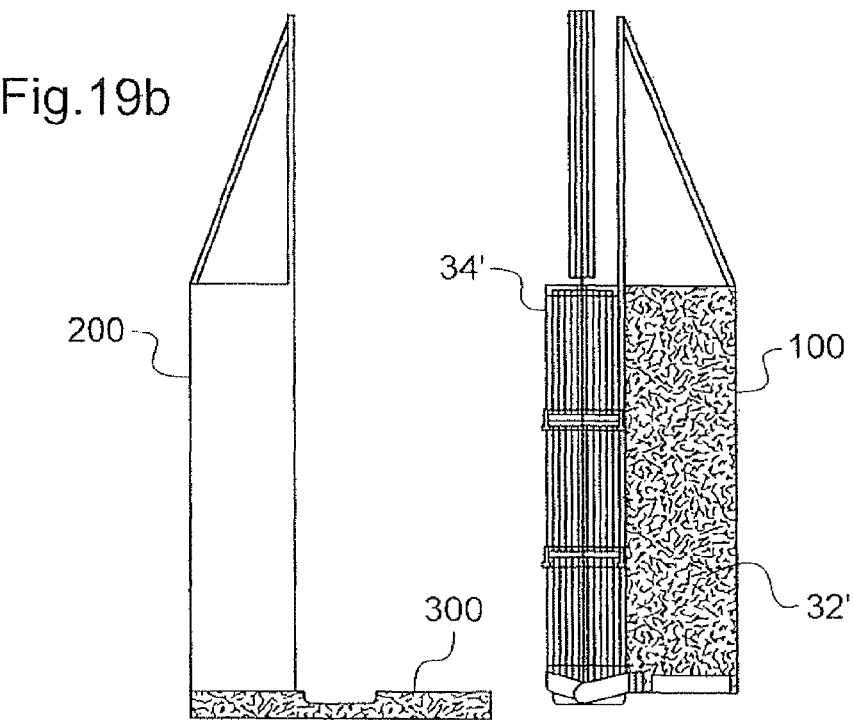

FIGS. 19a and 19b, an assembly comprising a main load provided with an antenna according to an embodiment of the invention and a piggy-back secondary payload or a ballast dummy; and FIG. 20 shows a radar antenna, formed by the structure of FIG. 3, FIGS. 21a, 21b, 22a, 22b, 23a and 23b show comparative plots of radiation patterns from a rectangular planar array and from two arrays according to different embodiments of the invention.

Figure 1:
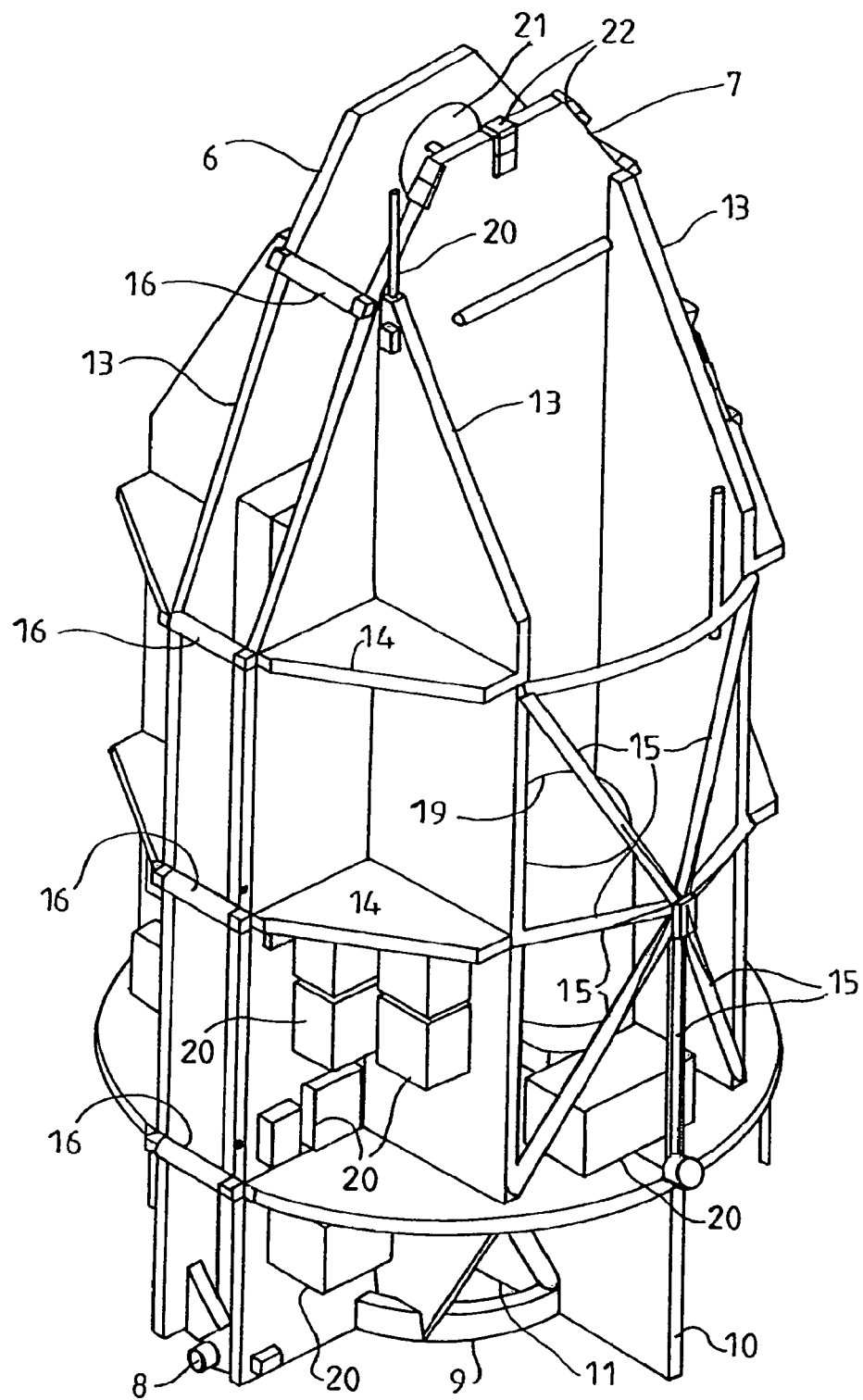
FIG. 1, shows a known spacecraft platform, in a stowed or folded state.
Figure 2:
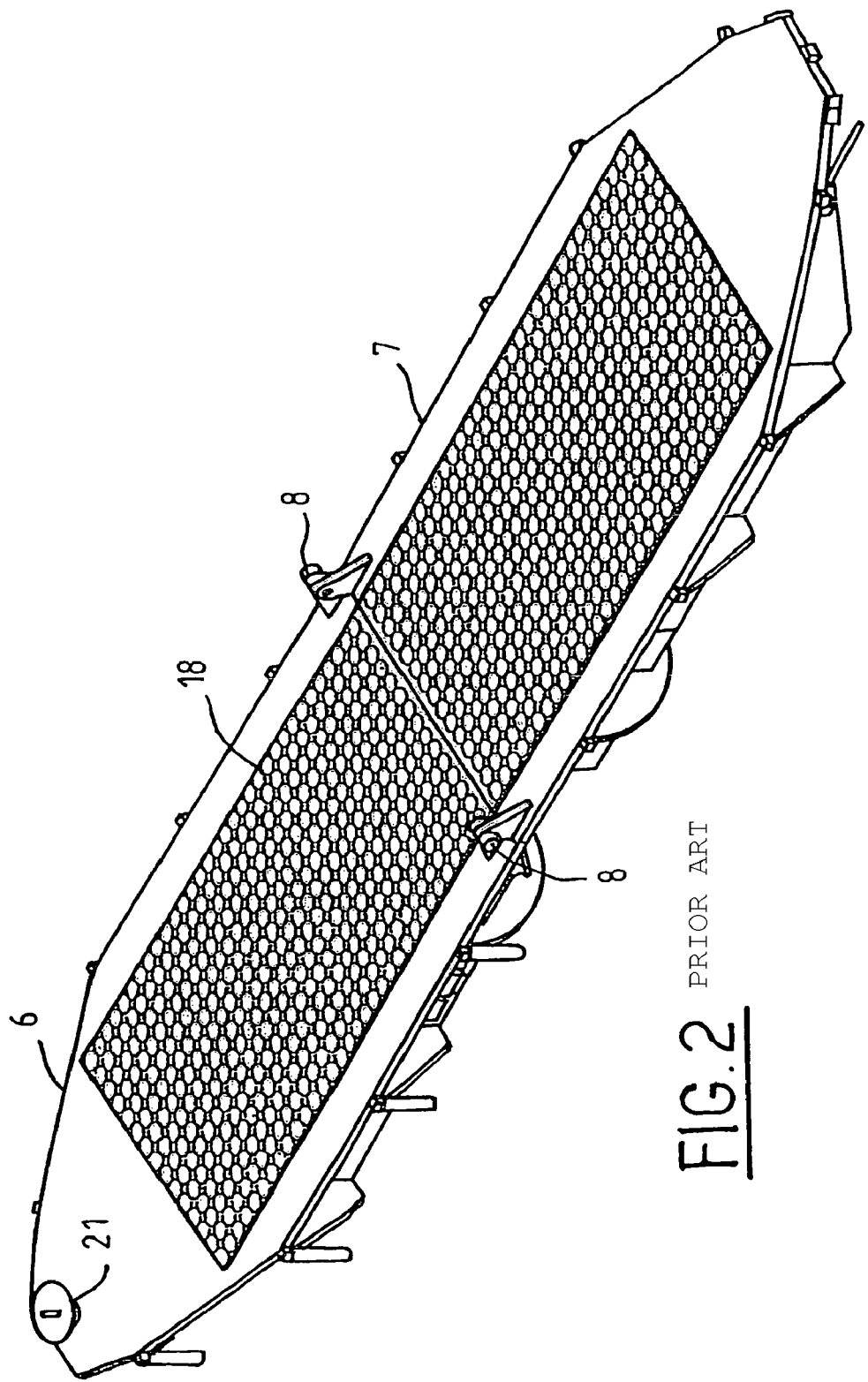
FIG. 2 shows the spacecraft platform of FIG. 1 in an unfolded or deployed state.

Referring to FIGS. 1 and 2, which are taken from above-mentioned European Patent 0888967, a spacecraft platform has two panels 6, 7 which are coupled together at the base by means of hinges 8. The spacecraft takes up the position shown in FIG. 1 when ready for launch. It is contained in a fairing and is positioned at the top of a launch vehicle. The launch vehicle has an interface ring which engages a payload adaptor ring which in turn engages the ring formed by the half-rings 9 at the base of the platform. The half rings 9, which form an integral part of the satellite structure, are attached to the launch vehicle by means of explosive bolts (not shown) or clampband. In order to deploy the spacecraft platform, the adaptor ring separates from the launcher interface ring, and the adaptor ring is then itself jettisoned. In some arrangements, the adaptor ring may be deleted altogether, so that the half rings 9 bear directly against the launch vehicle interface ring.

Above the payload interface ring 9 are webs 10, 11 and struts which carry the considerable forces at launch from the panel structures 6, 7 themselves. Running down the back of the panels are longitudinal ribs 13. Transverse to these longitudinal ribs are stiffening webs 14. A number of struts 15 are provided to further stiffen the rear faces of the panels.

The two panels 6, 7 are attached to each other at stiffening rib locations along the length of the panels by release mechanisms 16, which are operated to release the two halves when it is desired to deploy the structure. The release mechanisms could be pyrotechnic bolts, or other types. Release mechanisms of a retractable type are shown in FIG. 2. A motor, such as a spring motor or electric motor (not shown) is provided at the base of the platform, to unfold the two halves 6, 7. When the halves are fully extended, attachment points 17 abut corresponding attachment points 17, forming a three-point kinematic mount. A latch (not shown) holds the surfaces in the deployed condition, as shown in FIG. 2.

A conventional SAR antenna is accommodated on the front faces of the panel structures 6, 7. Its individual antenna elements are arranged in a rectangular array. Referring to FIG. 2, the SAR antenna, can be readily steered to a different Earth cover footprint. This would involve rotation of the spacecraft about the axis with the least moment of inertia. This is achieved with a high degree of stability.

The spacecraft contains fuel tanks 19 between the stiffening ribs on the rear of each panel 6, 7. Components 20 of the payload and service modules are supported from the rear faces of the panels 6, 7, being either directly mounted on the rear faces of the panels, or on the stiffening ribs or webs secured to the rear faces of the panels. The platform carries telemetry antennas, in order to establish contact with the control station on Earth for general housekeeping control of the spacecraft. One telemetry antenna 20 is provided at the top of one panel in its stowed state, the other (not shown) is provided at the base in the stowed state. Typically, the antenna would be in S-band.

A shaped e.g. parabolic dish 21, typically X-band, is a downlink antenna for transmitting the instrument data stream to Earth. Attitude and orbit control (AOCS) sensors 22 are provided for sensing the horizon or the stars.

Although this known arrangement stows the panels in a configuration well-suited to be accommodated in the launch vehicle, it does so at the cost of the surface area of the panels 6, 7 available for use as SAR antenna being relatively small. Whilst this may be adequate for SAR missions operating at higher frequencies, it does not provide sufficient area for an effective P-band SAR array, unless the panels 6, 7 are made considerably larger. Then a larger launch vehicle is necessary.

A more efficient solution is provided by the present invention. The following description is confined to the arrangement of the deployable panels: the infrastructure of the spacecraft platform necessary to support its operation can be as previously described.

Figure 3:
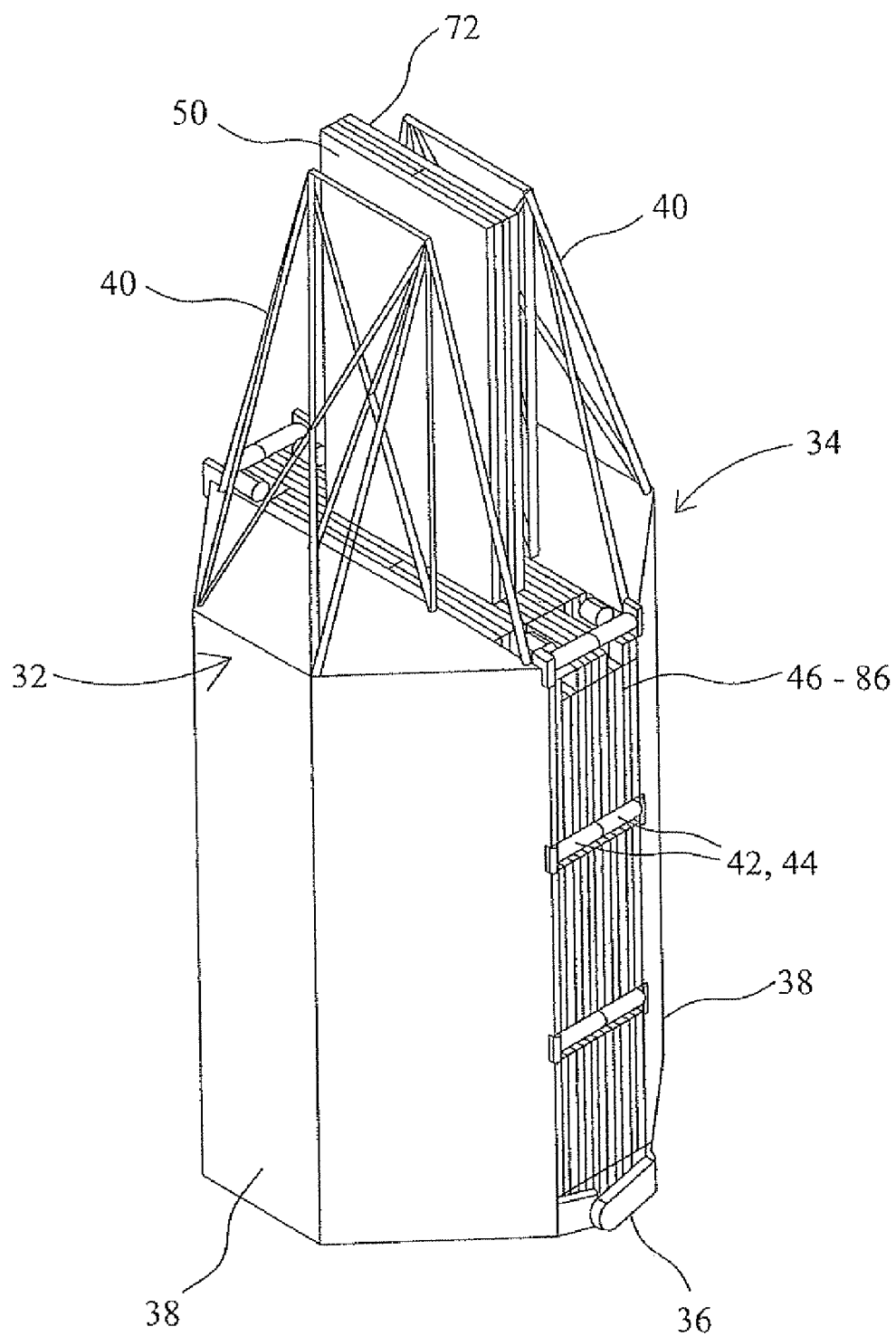
FIG. 3 shows a deployable panel structure according to one embodiment of the invention, forming part of a spacecraft platform.

Referring to FIG. 3, the structure comprises a pair of innermost (when deployed) panels 32, 34 which correspond to the panels 6, 7 of FIGS. 1 and 2. They are hinged together by a pair of hinges 36 so as to unfold about an axis transverse to what will be the longitudinal axis of an elongate SAR antenna when deployed. The panels 32, 34 carry functional systems on their outer surfaces as described for panels 6, 7 beneath cladding 38, which itself carries solar panels. Trusses 40 are provided at the forward (outer) ends of panels 32, 34 to provide support for further panels 46-86 in their deployed configuration, as hereafter described. Abutting pillars 42, 44 protruding from the panels 32, 34 maintain them a defined distance apart when stowed, to provide stowage space between them for the panels 46-88.

Figure 4:
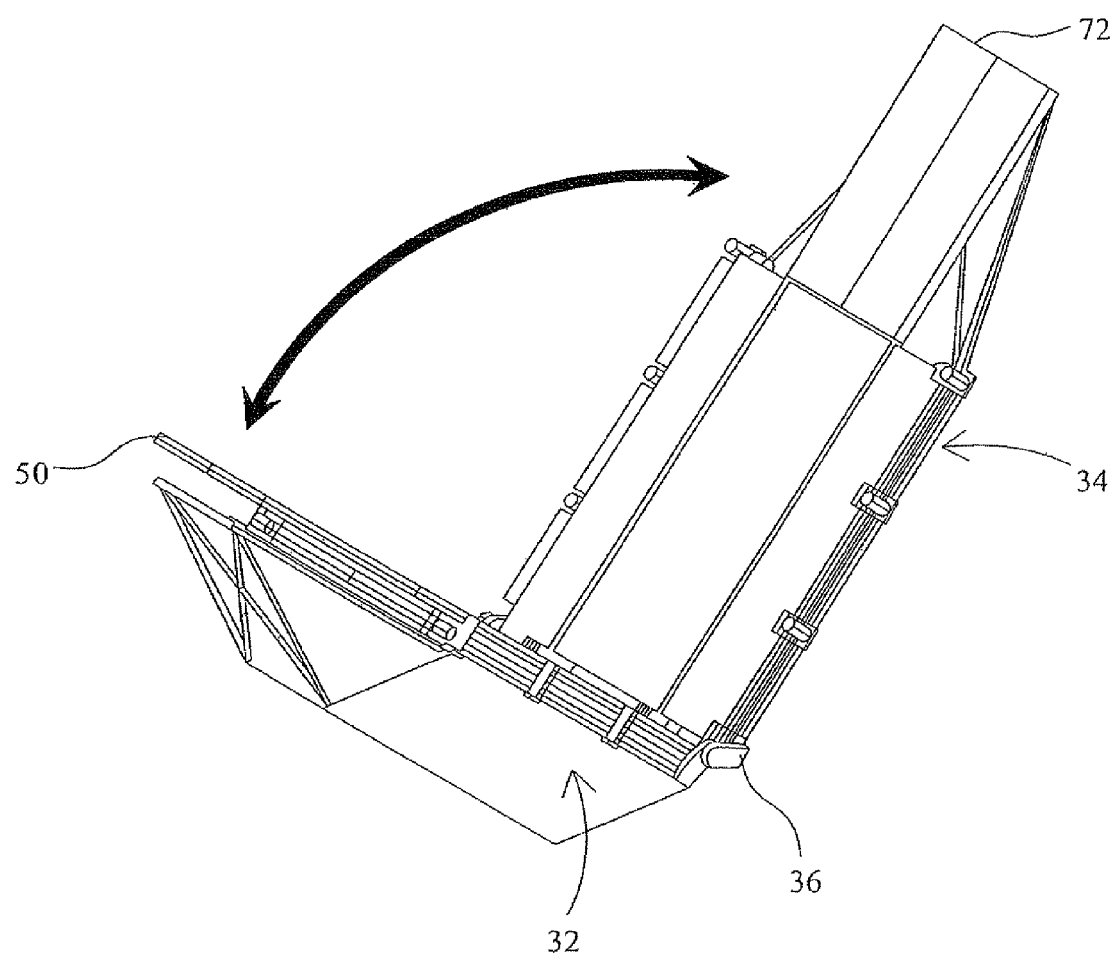
FIGS. 4 to 9 show successive stages in deployment of the panel structure of FIG. 3.

Referring to FIG. 4, the first stage of the deployment of the panels is for the panels 32, 34 to be unfolded about hinges 36 in a similar manner to the panels 6, 7 of FIGS. 1 and 2. The initial stage is shown complete in FIG. 5, with further nested panels ready for deployment. One set of nested panels 46-66 is carried by panel 32, and another set 68-88 by panel 34.

Figure 6:
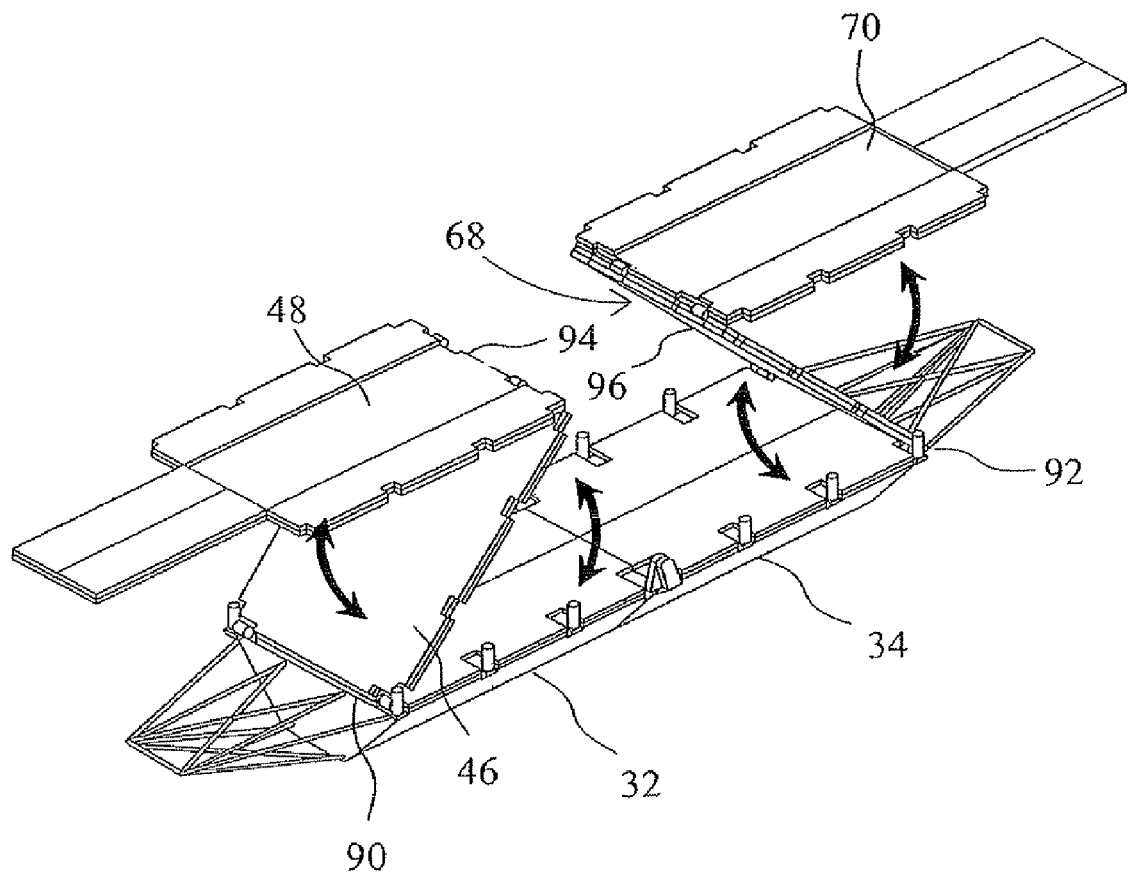

Referring to FIG. 6, a pair of inner intermediate panels 46, 68 are hinged at their inner transverse edges 90, 92 to the outer transverse edges of panels 32, 34 respectively. (By transverse we mean transverse to the longitudinal axis X-X of the deployed panel structure). The opposite transverse edges 94, 96 of panels 46, 68 are hinged to a pair of outer intermediate panels 48, 70. Thus both opposite edges of panels 46, 68 are hinged to further panels 32, 48 and 34, 70 respectively, about axes defined by the hinges and extending transversely of the longitudinal axis X-X of the structure. Deployment is effected by relative rotation of these two sets of panels about the transverse axes, so that the panels unfold concertina-fashion as can be seen in FIG. 6. The deployment is powered by rotary actuators (e.g. MOOG Schaeffer Type 3) at each of the hinges between the panels. The actuators are synchronised so that panels 48, 70 remain parallel to panels 32, 34 during deployment. Consideration of the relative rotations during deployment show that panel 46 rotates relative to panel 48 in the same sense as it rotates relative to panel 32. Likewise panel 68 rotates relative to panel 70 in the same sense as it rotates relative to panel 34.

Figure 7:
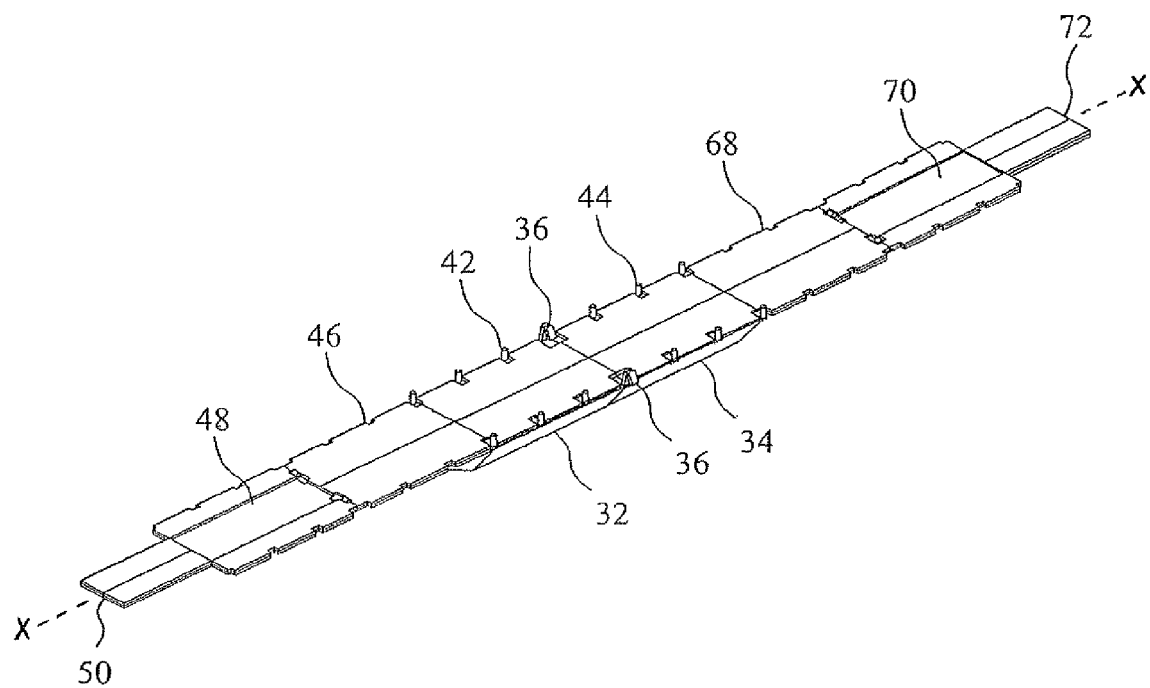

The completion of this stage of deployment is shown in FIG. 7: the panels 46, 68 are supported on the trusses 40, and the full elongated extent of the panel structure is evident. For simplicity and weight/saving, relatively narrow end panels 50, 72 are rigidly connected to panels 48, 70 and thus project into the tapering nose of the launch vehicle fairing when stowed, as can be seen in FIG. 3.

Figure 8:
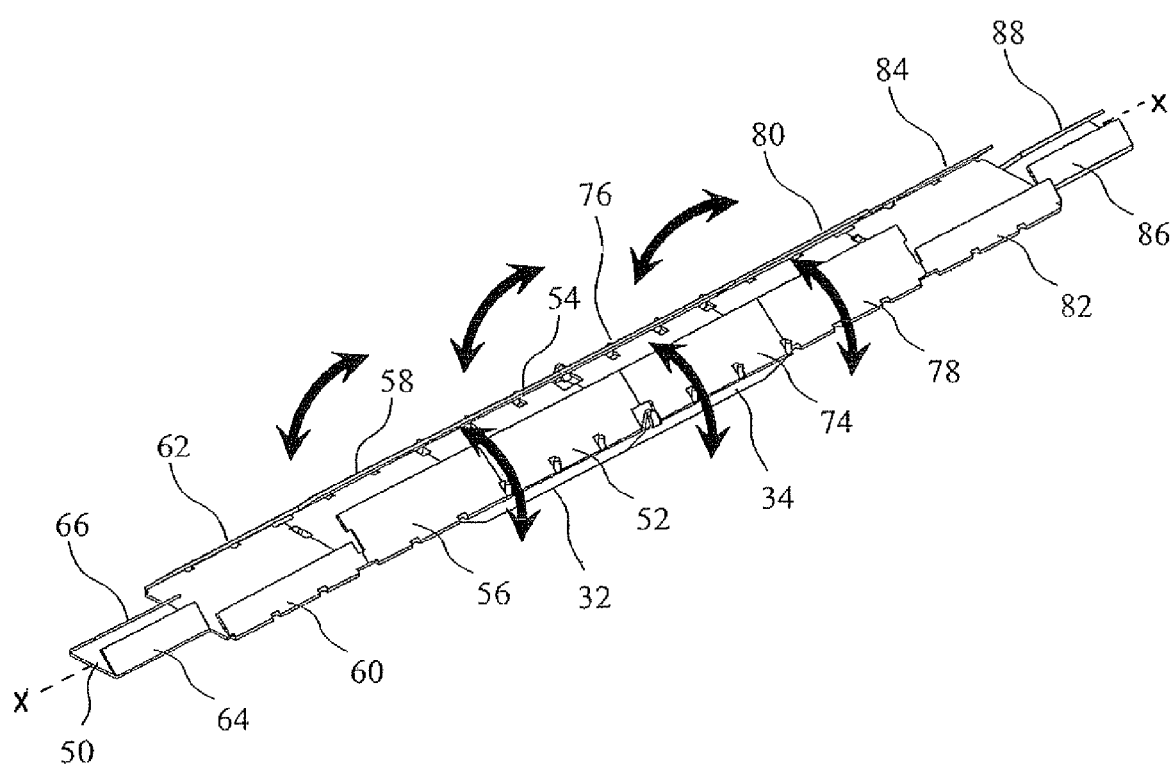

The next stage of deployment (FIG. 8) is the unfolding of edge or wing panels carried by all of the panels so far described. Each wing panel is connected by stored-energy (e.g. spring powered) hinges to its parent panel along a longitudinal edge lying parallel to the axis X-X of the structure. Thus panels 32, 46, 48 and 50 respectively carry pairs of wing panels (52, 54), (56, 58), (60, 62) and (64, 66). Likewise panels 34, 68, 70 and 72 respectively carry pairs of wing panels (74, 76), (78, 80), (82, 84) and (86, 88).

Panels 32, 34, 46, (48, 50), 68, and (70, 72) are hinged together about a plurality of spaced-apart axes which are transverse to an elongate axis of the unfolded structure, and form a first set of panels. Conversely, "wing" panels 52, 54, 56, 58, 60, 62, 64, 66, 74, 76, 78, 80, 82, 84, 86 and 88 are hinged to panels of the first set about lengthwise axes parallel to said elongate axis of the unfolded structure, and form a second set of panels.

Figure 9:
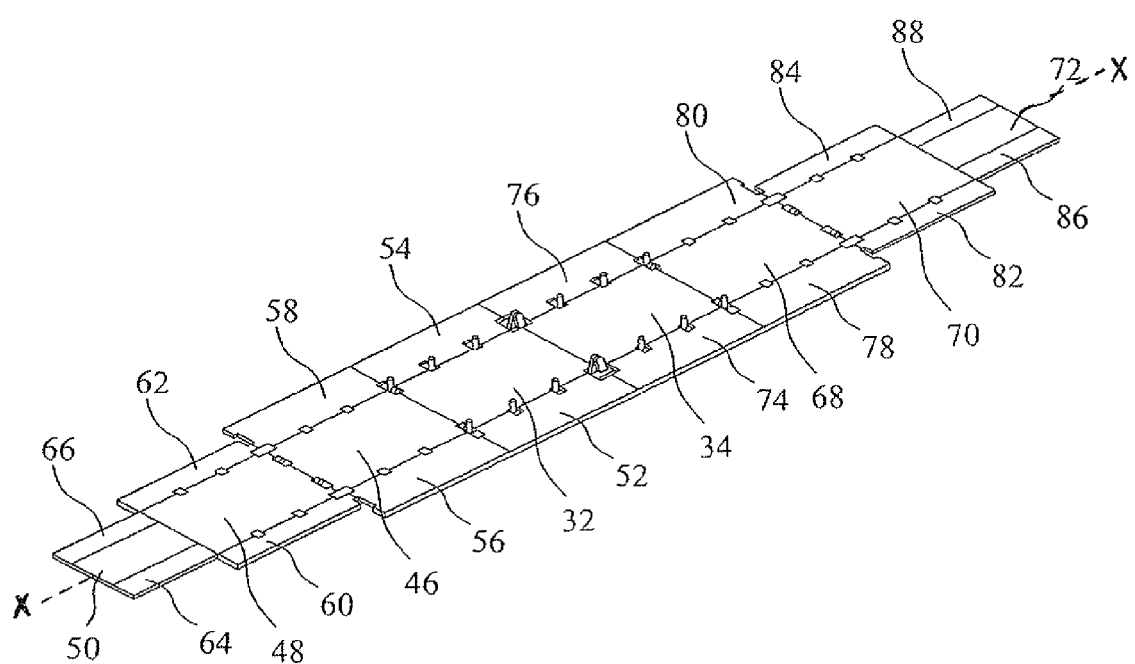

The wing panels in their unfolded state are shown in FIG. 9. It can be seen that a substantially greater useful panel area can be obtained compared to the arrangement of FIGS. 1 and 2.

Figure 10:
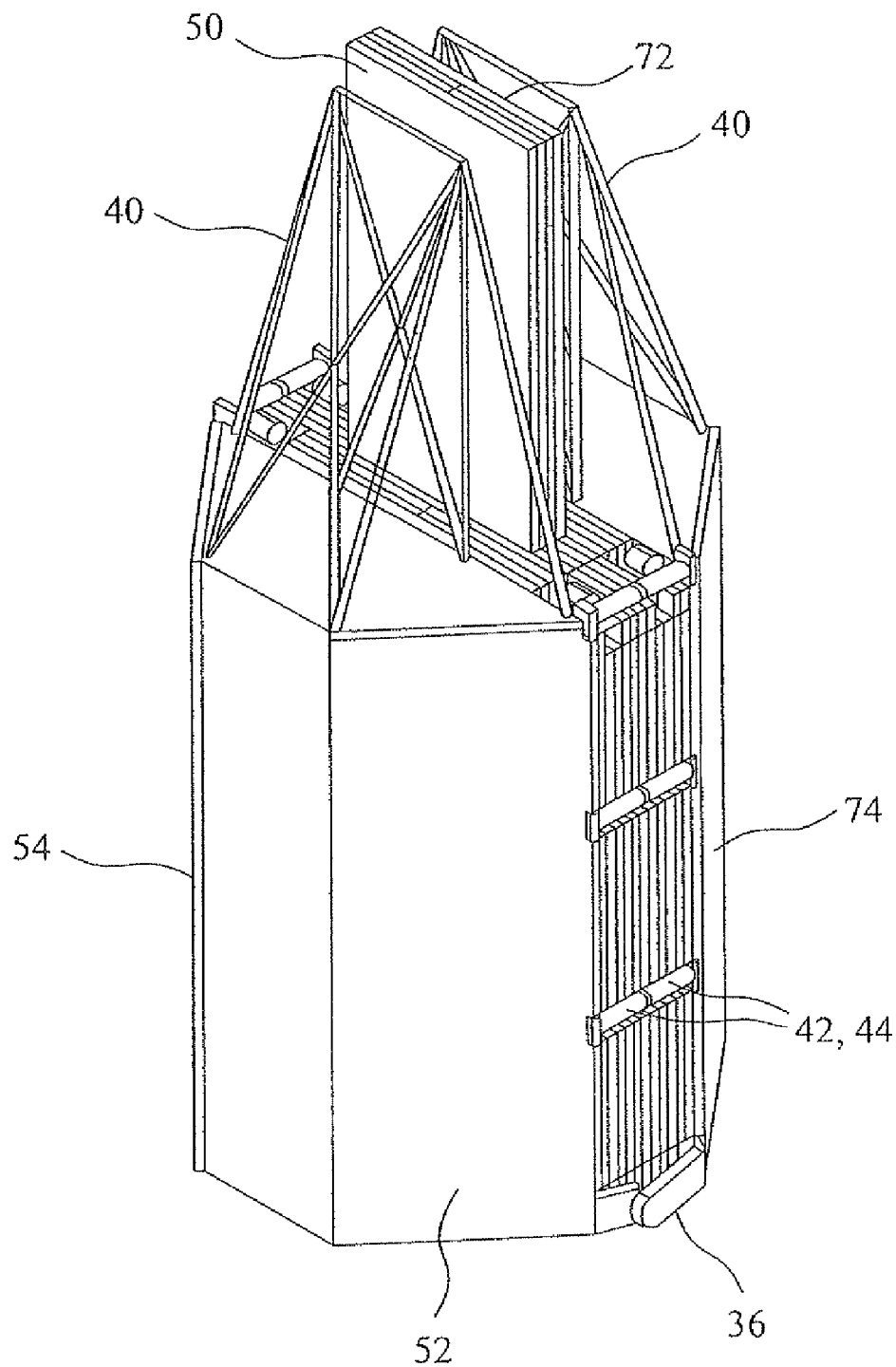
FIG. 10 shows another deployable panel structure according to the invention.

FIG. 10 shows another embodiment of the invention. Features already described with reference to FIGS. 3 to 9 carry the same reference numerals.

In this embodiment, the wing panels 52, 54 of panel 32, and wing panels 74, 76 are carried externally of the folded structure rather then within it. Thus, they partially envelop the rear structure of panels 32, 34 when the platform is in the stowed state.

Figure 11:
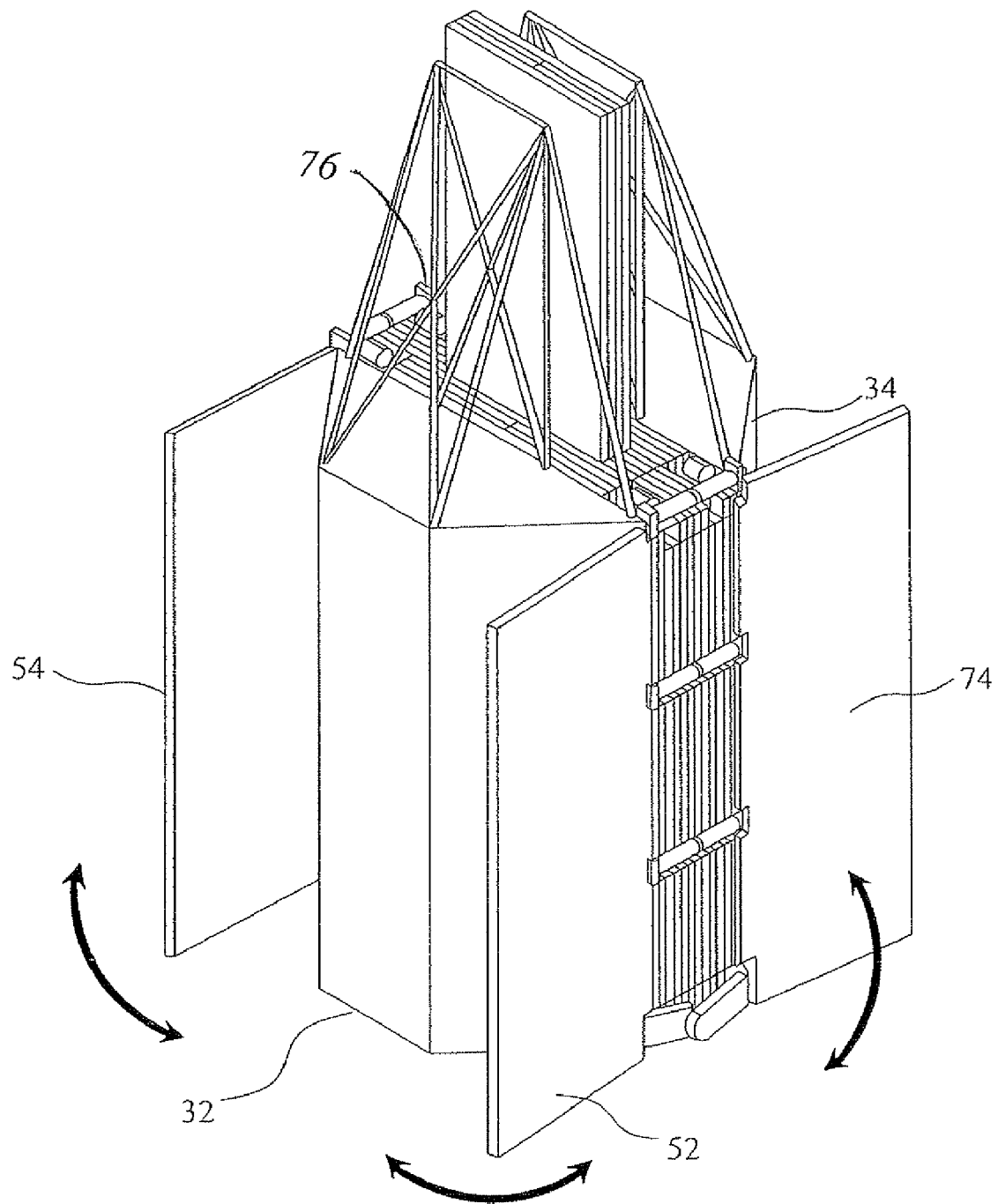
FIGS. 11 to 18 show successive stages in the deployment of the panel structure of FIG. 10.
Figure 12:
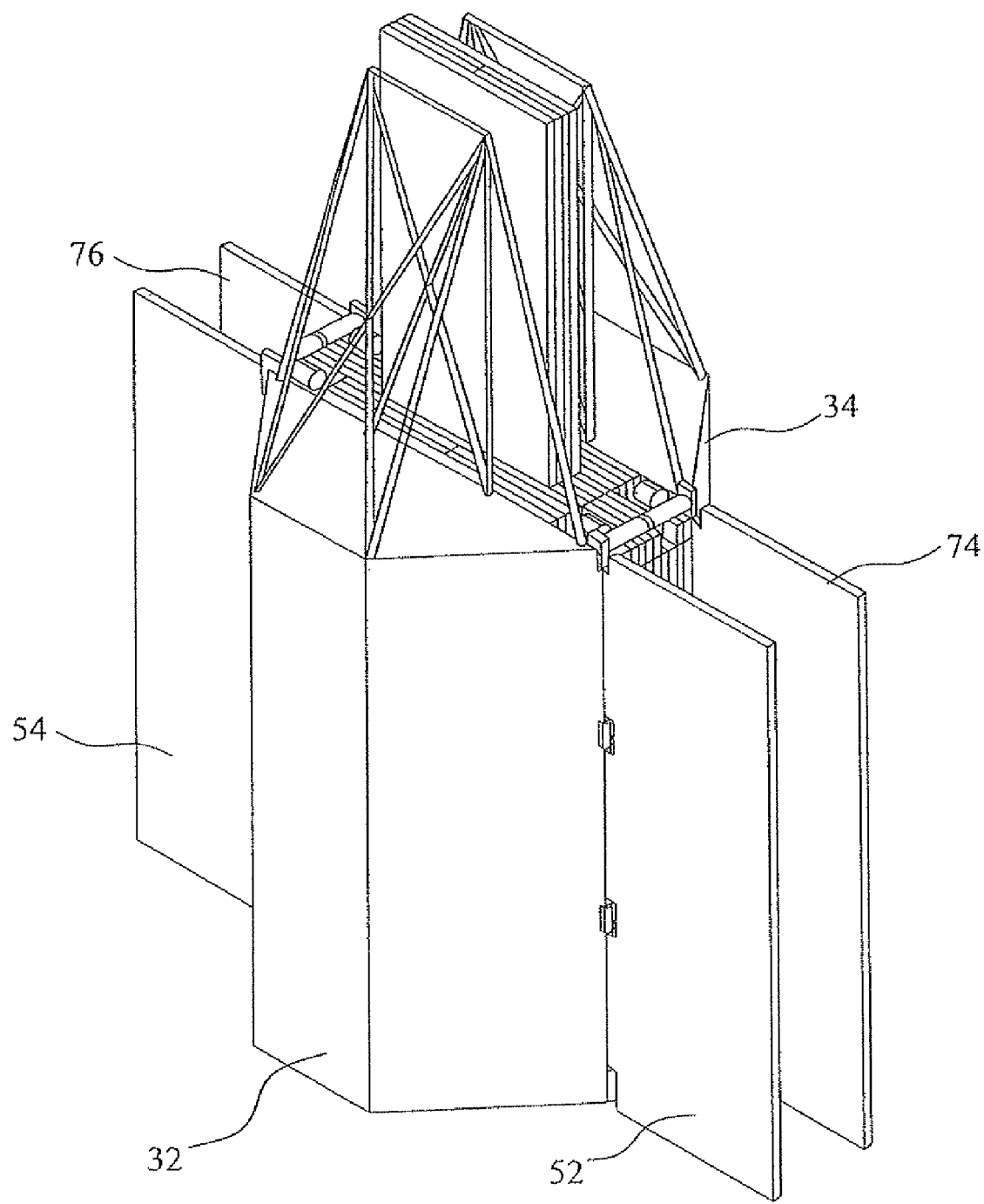
Figure 13:
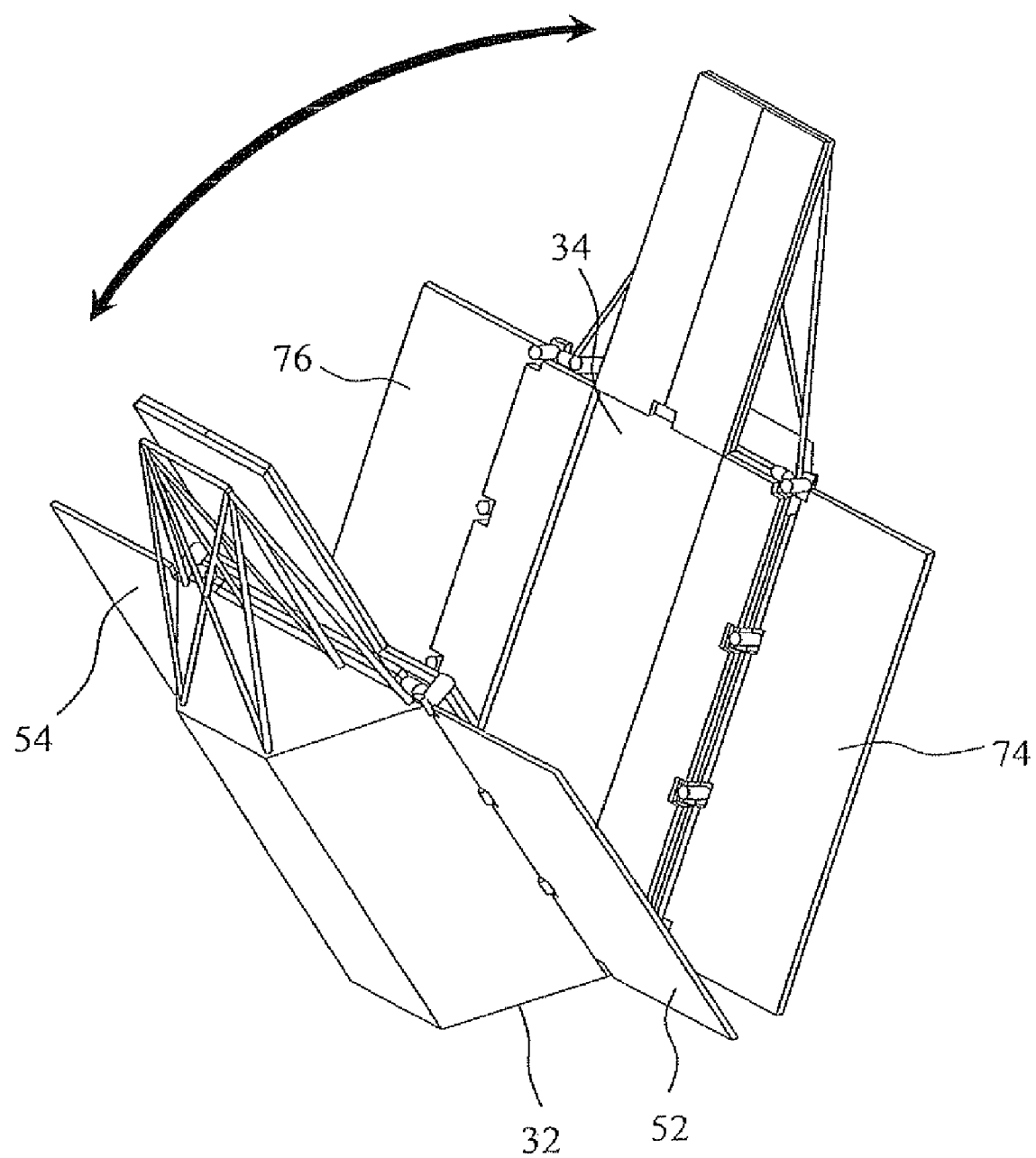

Deployment commences by unfolding panels 52, 54, 74, 76 (FIG. 11). When fully unfolded (FIG. 12), unfolding of panels 32 and 34 can commence (FIG. 13).

Figure 5:
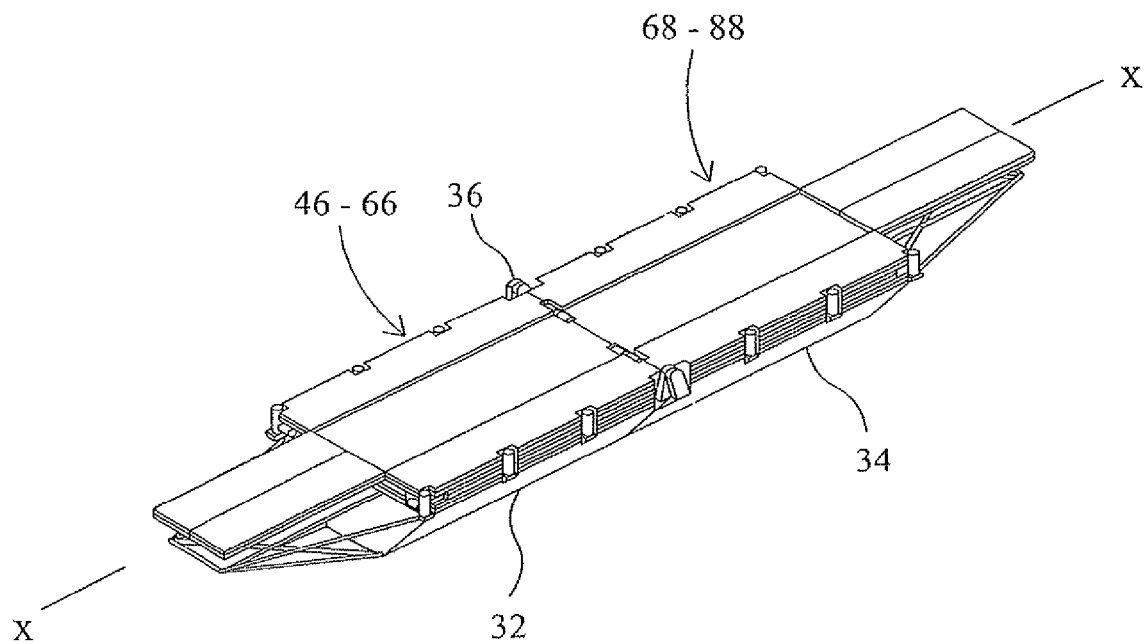
Figure 14:
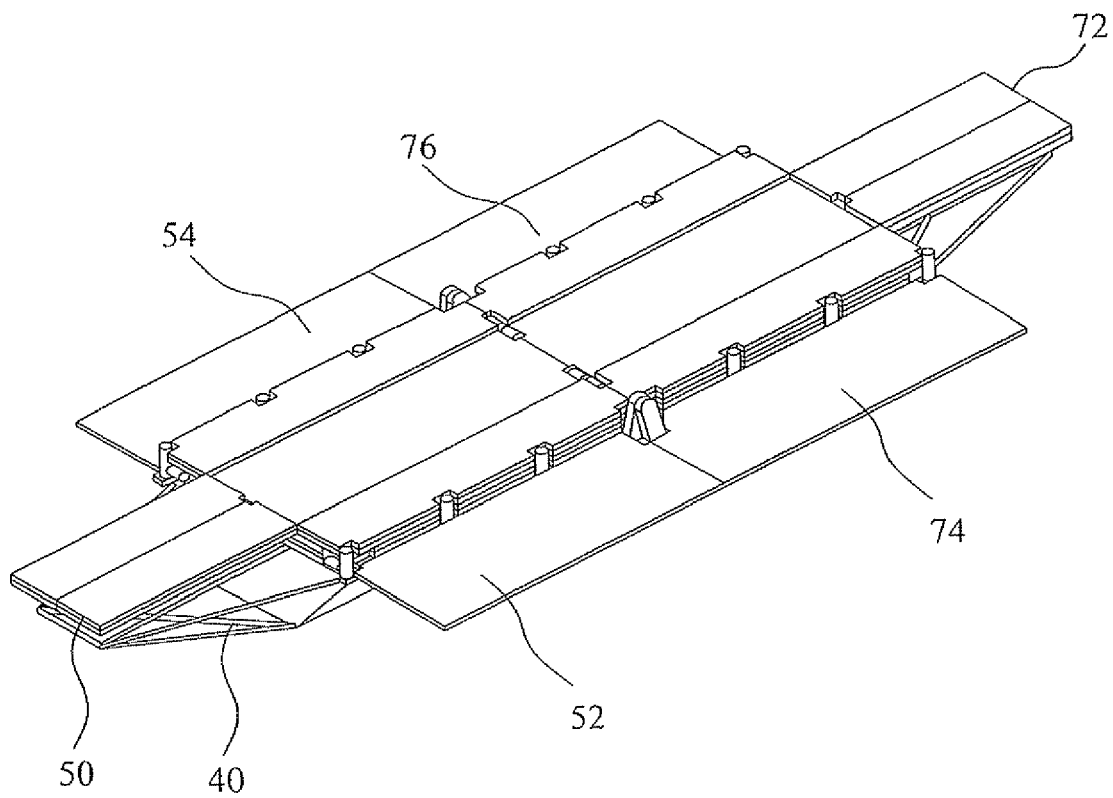
Figure 15:
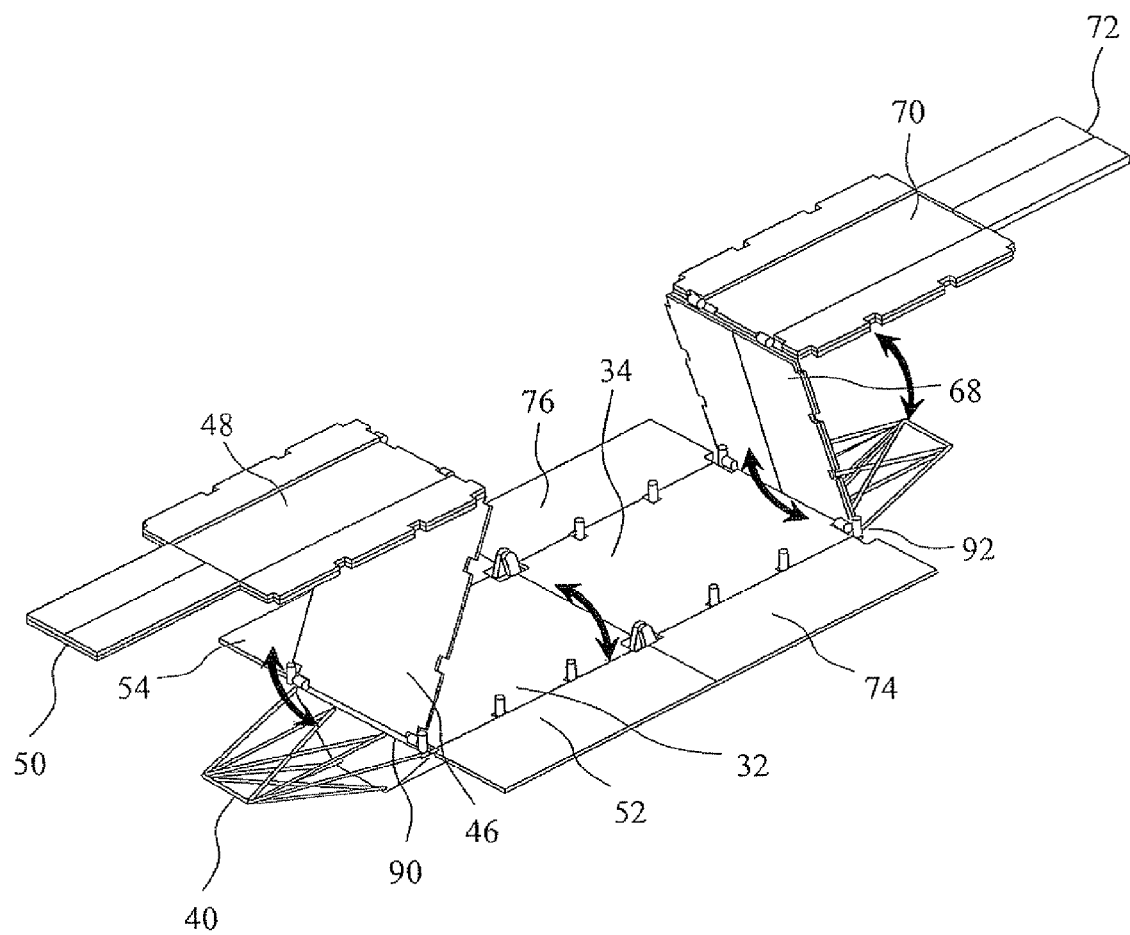
Figure 16:
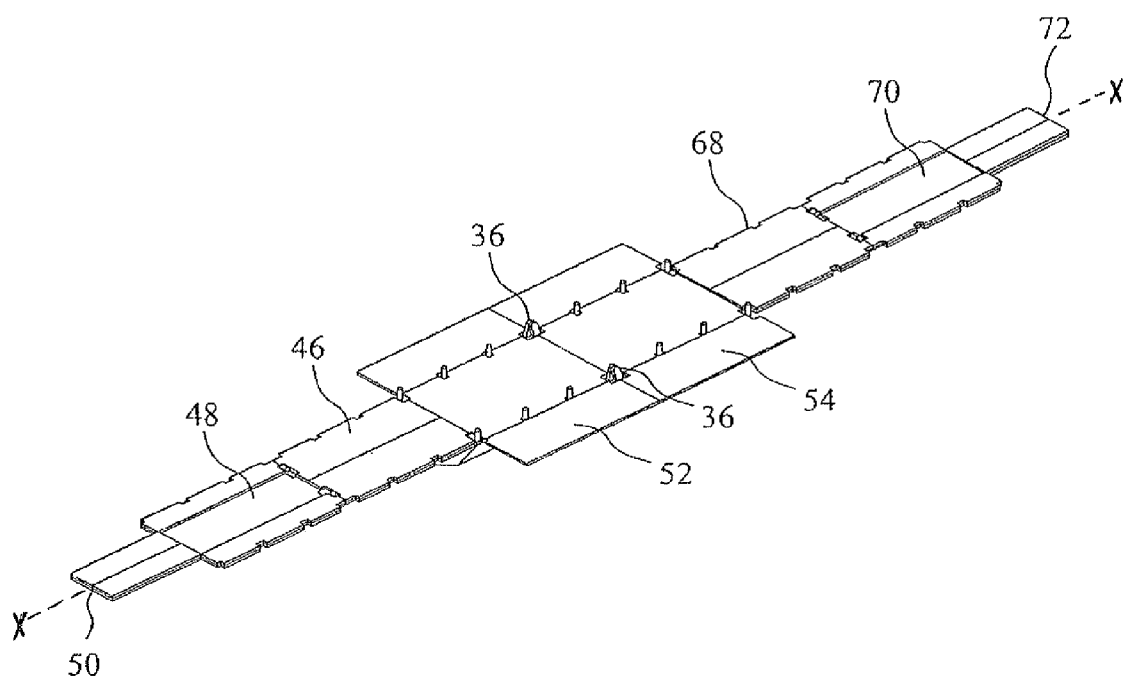
Figure 17:
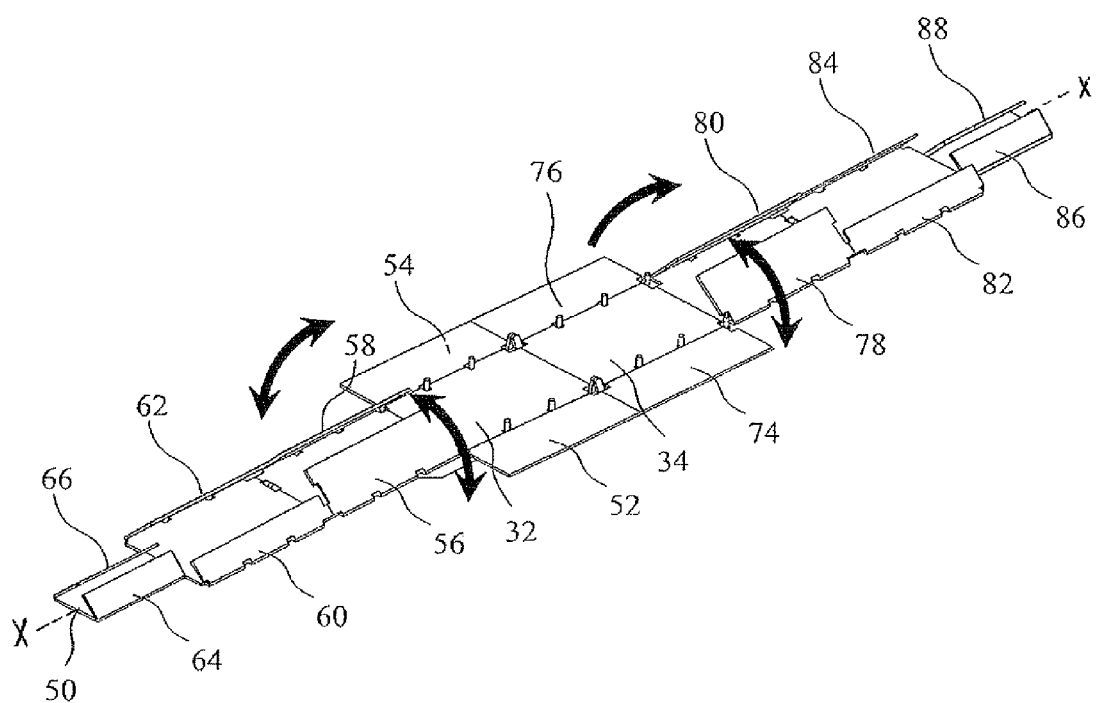
Figure 18:
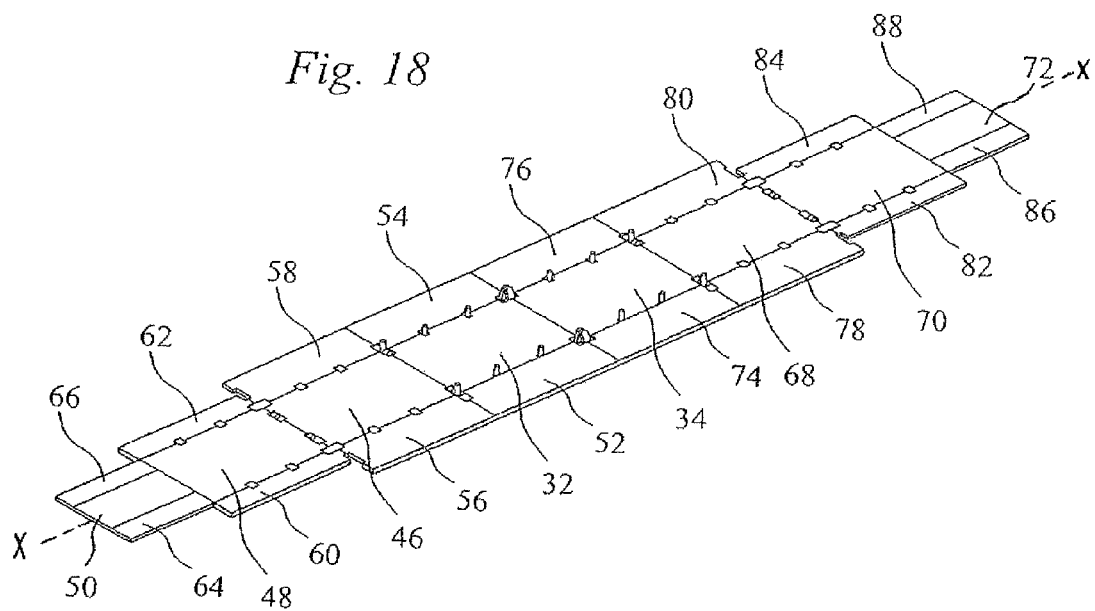

FIG. 14 shows panels 32 and 34 fully unfolded, and corresponds to FIG. 5 of the first embodiment. Deployment of the remaining panels then proceeds as illustrated in FIGS. 15 through 18, which correspond to FIGS. 6 through 9. The description relative to those figures applies equally to FIGS. 15 through 18 and so will not be repeated. It will be seen that the deployed configuration of FIG. 18 in the same as that of FIG. 9.

Besides leading to a more convenient surface/volume ratio, use of a "stepped" geometry allows increasing the stiffness of the panel structure, because it eliminates mass from the extremities of the rectangular form, pushing the torsional mode to higher frequencies. This effect is helpful from the Attitude and Orbit Control System (AOCS) point of view, since manoeuvres can be shaped and smoothed in order to avoid the excitation of the bending modes.

The results of a preliminary modal analysis of rectangular and stepped apertures are shown in the table below. For each of the apertures, the following simplified model assumptions are made:

Homogeneous panels of length 22 m and width 4 m,
Panel thickness of 40 mm
Young's modulus of $0.0686 \times 10^9 N/m^2$
Poisson coefficient of 0.3
Area density of 3 kg/m$^2$

TABLE 1

| Symbol | Mode (rectangular array) | Frequency (rectangular array) | Mode (stepped-aperture array) | Frequency (stepped-aperture array) | Frequency increase |
|---|---|---|---|---|---|
| $f_1$ | Symmetrical bending | 0.1773 Hz | Symmetrical bending | 0.2230 Hz | 25.8% |
| $f_2$ | Asymmetrical bending | 0.1778 Hz | Asymmetrical bending | 0.2236 Hz | 25.8% |
| $f_3$ | Torsional | 0.9774 Hz | $2^{nd}$ symmetrical bending | 1.1747 Hz | 20.2% |
| $f_4$ | Asymmetrical torsional | 0.9774 Hz | $2^{nd}$ asymmetrical bending | 1.1764 Hz | 20.4% |
| $f_5$ | $2^{nd}$ symmetrical bending | 1.1106 Hz | Torsional | 1.4803 | 33.3% |

Use of a stepped structure increases all the mode eigenfrequencies by 20-33.3%. Moreover, torsional oscillations are shifted from the $3^{rd}$ mode $f_3$ in the rectangular case to the $5^{th}$ mode in the stepped aperture case. The result is an increase by 51.5% of the eigenfrequency of torsional oscillations.

This simple analysis indicates that a stepped-aperture should be significantly stiffer—in particular in torsion—than a rectangular aperture of similar size and properties, which in addition would require a larger stowage space, and probably a larger launcher.

While above-mentioned European Patent 0888967 concerns a spacecraft platform comprising attachment means to a launcher, the panel structure of the invention is—in a preferred embodiment thereof—intended to be mounted on a separate platform.

FIG. 19a shows a spacecraft 100, carrying a panel structure according to the invention, mounted on an interface plate 300 which is releasably connected to a launcher. Spacecraft 100 is similar to the spacecraft of FIG. 3, except in that only one (32') of its main panels 32', 34' carries fuel tanks, solar panels and service and payload modules, the other main panel (34') being significantly thinner. Spacecraft 100 has an asymmetric shape, and it does not fill completely the fairing of a launcher. For this reason, a secondary payload or a ballast dummy 200 is also mounted on the interface plate 300.

FIG. 19b shows the spacecraft 100 separated from the interface plate 300 and ready for deployment. Element 200 is either a balancing ballast dummy or a secondary payload. Use of a secondary payload is generally preferred because it allows sharing the cost of the launch.

In a first embodiment of the invention, the deployable panels carry modular antenna elements, and in particular radar antenna elements together making up a SAR array. For operation in P-band (at 435 MHz), the module elements are contemplated for example as being located on a 500 mm square grid with a 340 mm square active area. FIG. 20 shows how the elements are arranged in the FIG. 3 embodiment: there are 292 elements extending over an area 22 m×4 m. Four elements are sacrificed to permit the accommodation of the hinges 36 which are offset from the plane of the array, in order to provide the necessary spacing between panels 32 and 34 for housing the other panels when the structure in its folded state.

In the FIG. 10 embodiment, the loss of the four elements is avoided, thus retaining the full complement of 296 radiating elements, because they do not have to protrude through the already semi-deployed panels 52, 54, 74, 76. The stowed package is also slightly thinner because those panels do not have to be housed between the panels 32, 34 in the stowed configuration. On the other hand, until the panels 52, 54, 74, 76 are fully deployed, they cover a substantial proportion of the solar panels provided on the outer cladding 38 of the rear surfaces of the panels 32, 34.

As can be seen from FIG. 20, the array is narrower (of less transverse width) at its ends than in the middle, forming a "stepped" aperture. This results in the side lobes of the array in its principal radiating planes being substantially reduced compared to those of a conventional rectangular array and the interference problem discussed above can be overcome either without resorting to differentially-powering individual elements of the array, or by a substantial reduction in the degree of such differential-powering.

Figure 21A:
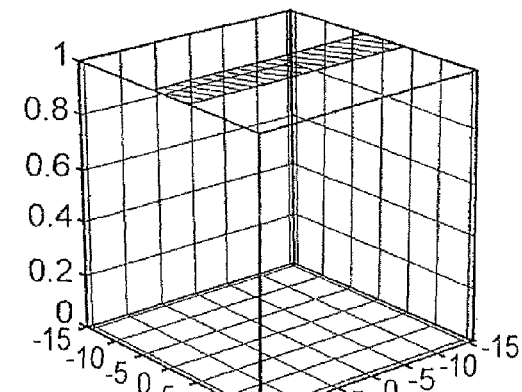
Figure 21B:
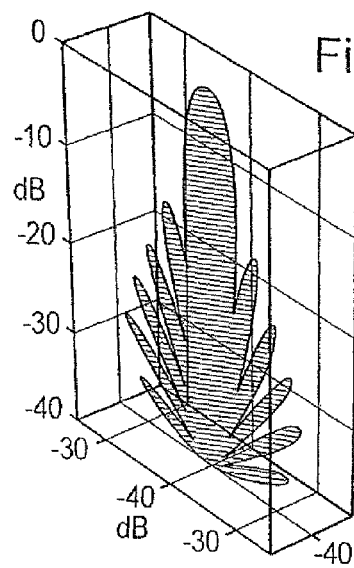

FIG. 21a shows the excitation pattern of a 44×8=352 element, 22 m×4 m rectangular array antenna, in the case of uniform excitation. FIG. 21b shows the corresponding elevation (in this case downwards towards the earth) radiation pattern at 435 MHz. This radiation pattern is characterized by high sidelobes (−13 dB), not compatible with the ITU recommendations, which are summarised in Table 2 and imply sidelobe suppression in the region of −20 dB

TABLE 2

| Parameter | Value |
| --- | --- |
| Peak power flux density on Earth's surface from antenna main lobe | −140 dBW/(m² · Hz)) |
| Maximum mean power flux density on Earth's surface from antenna main lobe | −150 dBW/(m² · Hz)) |
| Maximum mean power flux density on Earth's surface from 1st antenna side lobe | −170 dBW/(m² · Hz)) |

Figure 22A:
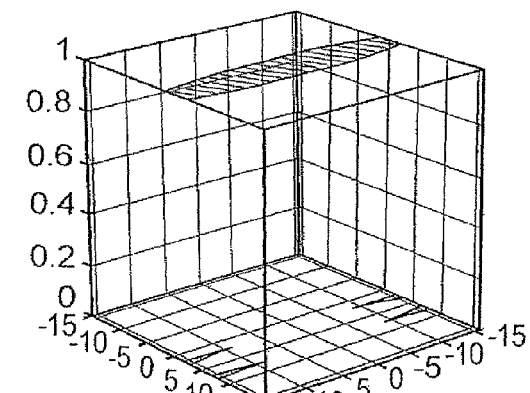
Figure 22B:
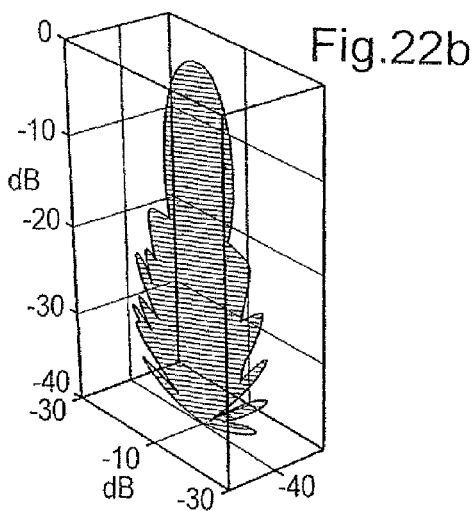
Figure 23A:
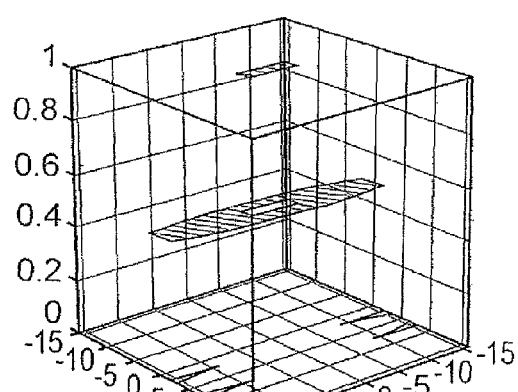
Figure 23B:
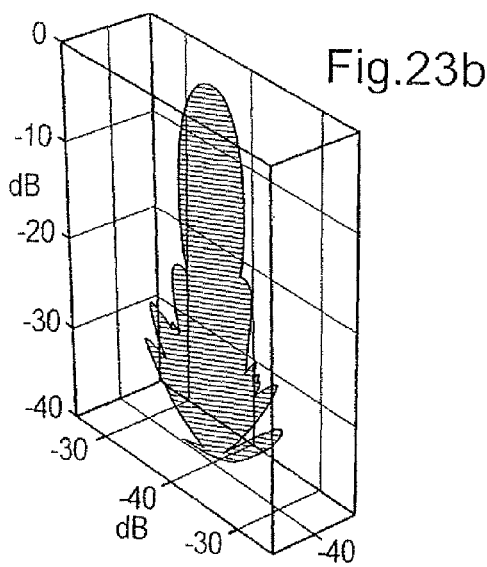

FIG. 22a shows the excitation pattern of the stepped-aperture array of FIG. 20 (296 elements disposed in 8 rows of 24, 36, 44, 44, 44, 44, 36, 24 elements respectively; the loss of four elements due to hinges is neglected) in the case of uniform excitation. The stepped-aperture array is simulated by "turning off" 56 corner elements of the rectangular array of FIG. 21a. The corresponding radiation pattern, represented on FIG. 22b, shows much reduced sidelobes, at −17.5 dB, i.e. closer to level required to satisfy the ITU recommendations. As represented on FIGS. 23a, 23b, full compliance with said recommendations can be obtained by using a two-level excitation, wherein the excitation amplitude of a central rectangular set of 4×12 elements is twice that of the remaining elements of the stepped aperture. The radiation pattern of FIG. 23b shows that this simple differential powering—which only introduces a limited additional complexity—allows achieving a <−20 dB sidelobe level, thus allowing the ITU recommendations to be satisfied.

The specifically-described embodiments provide a SAR array. A panel structure according to the invention can also be used for a passive (receiving) and/or active (emitting) communication array antenna.

The use of a structure comprising panels which are unfolded about a principal lengthwise axis and a secondary transverse axis allows increasing the antenna width with respect to its length. According to the known laws of electromagnetic wave propagation, this results in a radiated beam which is more confined in the width-wise direction with respect to that emitted by an antenna composed by panels which are unfolded about a single, lengthwise axis and having the same folded volume. In addition, the resulting increase in the number of element rows (from 4 to 8) allows for a better controlled shape of the radiated beam, and/or a limited steerability of the radiated beam in the width-wise direction.

The embodiments described provide a single elongate deployed structure with two arms about a central principal transverse axis. There could however be two such structures deployed orthogonally to each other so that as to form a cross-shaped deployment. The panels 32, 34 of each structure then fold towards each other in the stowed configuration to form a box-like enclosure in which the panels of each arm of the cross are contained. The void in the middle of the enclosure between the four sets of panels can be utilised for other payload.

Moreover, each half of the structure of FIGS. 3 and 10 itself constitutes a deployable panel structure according to the invention in its own right, and the invention also contemplates the use of one such structure, or a different number e.g. three or even five, so that in the deployed configuration the structure is star-shaped.

The two embodiments described provide a single elongate deployed structure with two arms about a control principal transverse axis. There could however be two such structures deployed orthogonally to each other so that as to form a cross-shaped deployment. The panels 32, 34 of each structure then fold towards each other in the stowed configuration to form a box-like enclosure in which the panels of each arm of the cross are contained. The void in the middle of the enclosure between the four sets of panels can be utilised for other payload.

The invention claimed is:

1. A deployable panel structure for an array antenna comprising a first and a second set of panels hinged together for deployment between a folded configuration for stowage and an elongate unfolded configuration; wherein said panels carry a plurality of antenna elements which, when the structure is deployed, formed an array antenna, wherein the panels of said first set are hinged together about a plurality of spaced-apart axes which are transverse to an elongate axis of the unfolded structure and the panels of said second set are hinged to panels of the first set about lengthwise axes parallel to said elongate axis of the unfolded structure; and wherein the number and arrangement of the panels is such that a width of the unfolded structure, measured transversely of its elongate extent, is less at both of its ends than the width of its middle portion, wherein a principal said transverse axis is approximately at a mid-point of the longitudinal extent of the unfolded structure; wherein the structure is folded such that it is wider-measured transversely of its longitudinal extent—at one end than at the other; and wherein said one end becomes the mid-point of the structure when unfolded.

2. A structure according to claim 1, wherein the width of said structure in its deployed state decreases stepwise from said central portion towards both its ends in said longitudinal direction.

3. A structure according to claim 1, wherein a first panel of the first set is hinged along opposite edges thereof to at least two second said panels of the first set such that upon deployment there is relative rotation between the first panel and each second panel in the same sense.

4. A structure according to claim 1 wherein in the folded configuration a plurality of panels define a stowage space in which further panels are disposed.

5. A structure according to claim 1, wherein the reduced width on the unfolded structure toward its ends is provided by a change in the number of panels of said second set along the length of the array.

6. A structure according to claim 1, wherein the reduced width on the unfolded structure toward its ends is provided by a change in the width of panels along the length of the array.

7. A structure according to claim 1, wherein at least one panel of said second set is disposed so that upon deployment of the structure, it is unfolded about a lengthwise axis before the structure is unfolded about the principal transverse axis.

8. A structure according to claim 1, wherein the structure is adapted to deploy from its folded to its unfolded configuration in the following sequence:
  the structure is unfolded about the principal transverse axis
    at least one panel of said first set is unfolded about another said transverse axis or axes
    at least one panel of said second set is unfolded about a said lengthwise axis or axes.

9. A structure according to claim 1, wherein the structure is adapted to deploy from its folded to its unfolded configuration in the following sequence:
  at least one panel of said second set is unfolded about a said lengthwise axis
  the structure is unfolded about the principal transverse axis
    at least one panel of said first set is unfolded about another said transverse axis
    at least one further panel of said second set is unfolded about a said lengthwise axis.

10. A synthetic aperture radar comprising an array antenna constituted by a structure according to claim 1.

11. A communication payload comprising an array antenna constituted by a structure according to claim 1.

12. A spacecraft comprising an array antenna constituted by a structure according to claim 1.

13. A spacecraft according to claim 12, further comprising payload and service modules supported from rear faces of at least one panel hinged about said principal transverse axis.

* * * * *